United States Patent [19]

Hanson

[11] Patent Number: 4,546,996

[45] Date of Patent: Oct. 15, 1985

[54] MULTI-SURFACE STABILIZER PAD ASSEMBLY

[75] Inventor: Charles B. Hanson, Burlington, Iowa

[73] Assignee: J. I. Case Company, Racine, Wis.

[21] Appl. No.: 621,686

[22] Filed: Jun. 18, 1984

[51] Int. Cl.$^4$ .................... B60S 9/10

[52] U.S. Cl. .................... 280/764.1; 212/189; 182/109

[58] Field of Search .............. 280/763.1, 764.1, 765.1, 280/766.1; 212/189; 182/108, 109, 111; 248/188.8, 188.9; 254/419, DIG. 4

[56] References Cited

U.S. PATENT DOCUMENTS

| | | | |
|---|---|---|---|
| 3,721,458 | 3/1973 | Mitchell | 280/150.5 |
| 3,897,079 | 7/1975 | MacKenzie et al. | 280/150.5 |
| 3,913,942 | 10/1975 | MacKenzie et al. | 280/150.5 |
| 3,930,668 | 1/1976 | Schuermann et al. | 280/150.5 |
| 4,023,828 | 5/1977 | MacKenzie et al. | 280/764.1 |

*Primary Examiner*—David M. Mitchell
*Assistant Examiner*—Richard M. Camby
*Attorney, Agent, or Firm*—Dressler, Goldsmith, Shore, Sutker & Milnamow, Ltd.

[57] ABSTRACT

A selectively positionable pad assembly for the stabilizer of a material handling implement is disclosed wherein the pad assembly includes multiple ground-engaging surfaces. The pad assembly includes a mounting bracket which is pivotally connected to a free end of a vertically movable stabilizer arm for relative movement with respect to the arm about a first axis. The assembly further includes a pivotal pad member pivotally connected to the mounting bracket for relative pivotal movement with respect thereto about a second axis which extends at an acute angle with respect to the first axis. The pivotal pad member includes first and second pad portions which respectively define first and second ground-engaging surfaces. The first ground-engaging surface is provided in a grouser-like configuration for use on relatively soft ground, while the second surface is defined by resilient elastomeric elements for use on relatively hard ground such as asphalt or concrete. A lock pin arrangement is provided for maintaining the selected one of the pad portions in position for use, thus permitting very convenient repositioning of the pivotal pad member for use of the ground-engaging surface which is best suited for the material handling operation to be performed.

14 Claims, 5 Drawing Figures

MULTI-SURFACE STABILIZER PAD ASSEMBLY

TECHNICAL FIELD

The present invention relates generally to stabilizers for material handling implements, and more particularly to a selectively positionable stabilizer pad assembly having multiple ground-engaging surfaces.

BACKGROUND OF THE INVENTION

The versatility of a material handling device such as a backhoe permits its use for many different material handling operations under many different working conditions. Efficient operation is always a key consideration, and thus it is always desirable that such equipment be configured to operate with minimal "down time".

In order to provide stability for a backhoe during use, a pair of vertically movable stabilizers or outriggers are typically provided on the backhoe frame. The stabilizers typically each include a pad assembly at the free end thereof having a ground-engaging surface. Before operating the backhoe, the stabilizers are lowered through the use of hydraulic fluid rams to support the machine and provide a wider "stance" to better stabilize the machine during digging or the like.

As will be recognized, very substantial forces can be generated between the stabilizer pad assemblies and the ground during digging operations. Thus, operating efficiency dictates that the stabilizer pad assemblies be configured for effecting a good "grip" with the ground.

Of course, no single pad configuration is ideally suited for use under all operating conditions. For example, for use on relatively soft ground, a stabilizer pad configured to "dig in" and grip the ground is preferred. In contrast, use of the machine on asphalt or concrete calls for use of a resilient ground-engaging pad surface for good grip while avoiding damage to the asphalt. When used on grassy surfaces, it can be desirable to equip the stabilizers with flat surfaced pads, and employ a stake for maintaining the pads in position.

As will be appreciated, time spent replacing or otherwise re-configuring stabilizer pad assemblies for use on different surfaces undesirably detracts from operating efficiency. Thus, it is very desirable to provide a stabilizer pad construction which promotes convenient and efficient re-configuration of the pad for providing a good grip regardless of the type of surface upon which stabilizers are positioned.

SUMMARY OF THE INVENTION

A multi-surface stabilizer pad assembly embodying the principles of the present invention is disclosed which is desirably configured to permit selective positioning of two or more ground-engaging surfaces defined thereby. Notably, the construction includes a pivotal pad member which can be easily pivoted with respect to the stabilizer arm on which it is mounted for selective use of the differently configured ground-engaging surfaces of the pad member. This configuration permits very convenient selection of the ground-engaging surface of the pad member which is best suited for the particular operating conditions, thus very desirably enhancing the efficiency with which work operations can be performed.

The pad assembly of the present invention is suited for use on a vertically movable stabilizer arm of a material handling implement such as a backhoe. The assembly comprises a pad bracket which is pivotally connected to a free end of the stabilizer arm for relative pivotal movement about a first axis.

The present assembly further includes a pad member having first and second portions respectively defining first and second ground-engaging surfaces. In the illustrated embodiments, the first ground-engaging surface is provided with a grouser-like configuration having depending flanges for use on relatively soft ground. In contrast, the second ground-engaging surface is defined by resilient elastomeric elements for use on relatively hard surfaces such as asphalt or concrete.

The present pad assembly further includes means for pivotally connecting the pad member to the pad bracket for pivotal movement of the pad member with respect to the bracket about a second axis which extends at an acute angle with respect to the first axis. By this construction, either one of the ground-engaging surfaces of the pivotal pad member can readily be positioned in a generally downwardly facing disposition for use. In the preferred embodiment, the one of the pad portions of the pad member which is not being used is positioned to generally face the working area of the pivotal boom assembly of the associated backhoe, thus desirably affording protection to the stabilizer arm and its hydraulic ram against damage from inadvertent contact by the backhoe bucket.

A locking arrangement is provided for releasably locking the pivotal pad member in position for use of the selected one of its ground-engaging surfaces. The illustrated locking arrangement is desirably straightforward for economical manufacture, durability, and convenient use. A first pin-receiving opening is defined by the pad bracket of the assembly, with each of the first and second portions of the pad member respectively defining a pair of second pin-receiving openings. The second pin-receiving openings can each be aligned with the first opening attendant to selective rotational positioning of the pivotal pad member, with a lock pin provided which is received within the first pin-receiving opening and the aligned one of the second pin-receiving openings. In one illustrated embodiment of the invention, the lock pin is movably mounted on the pad bracket by way of a pivotal latch lock, thus further promoting convenient selective positioning of the pivotal pad member.

Numerous other features and advantages of the present invention will become readily apparent from the following detailed description, the accompanying drawings, and the appended claims.

DETAILED DESCRIPTION

Figure 1:
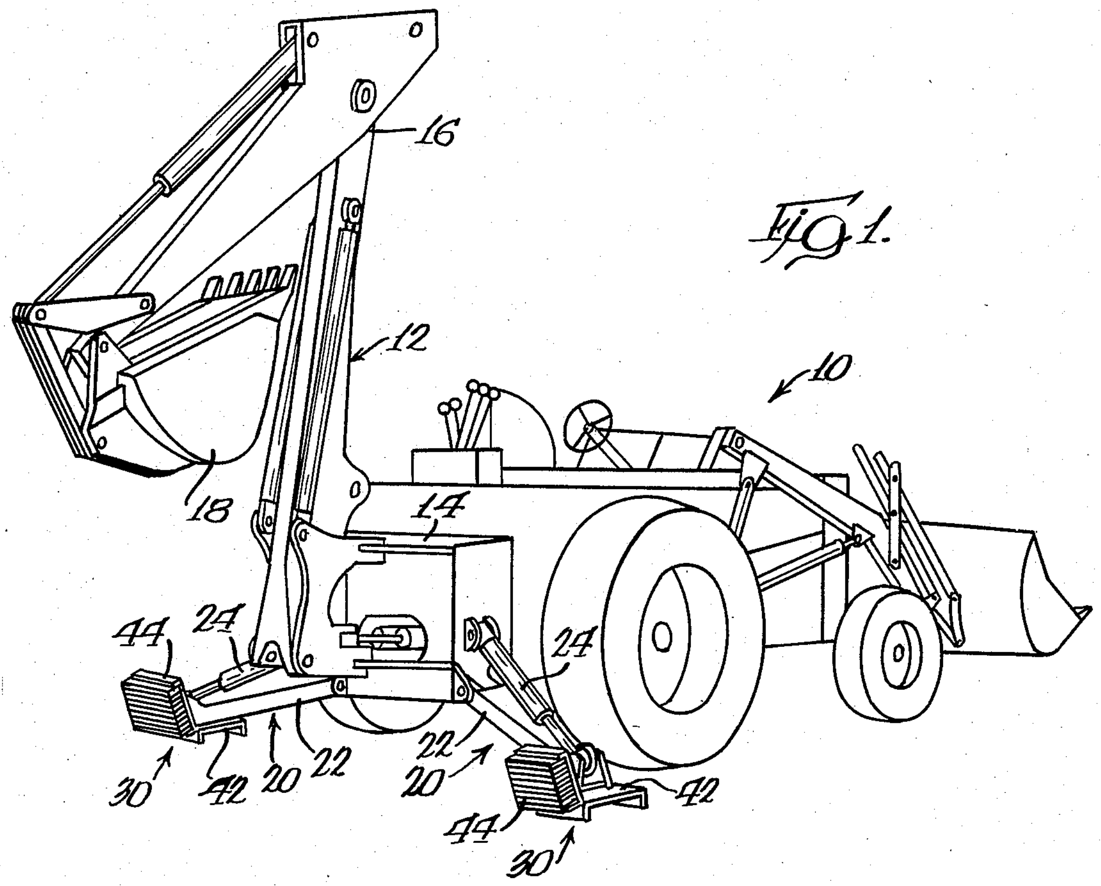
FIG. 1 is a rear perspective view of a backhoe mounted on an associated material handling implement wherein the backhoe includes a pair of stabilizer arms having selectively positionable pad assemblies embodying the principles of the present invention.

While the present invention is susceptible of embodiment in various forms, there is shown in the drawings and will hereinafter be described first and second embodiments of the present invention, with the understanding that the present disclosure is to be considered as an exemplification of the invention, and is not intended to limit the invention to the specific embodiments illustrated.

With reference first to FIG. 1, therein is illustrated a material handling implement shown as a tractor 10 having a backhoe 12 mounted at the rear thereof. Backhoe 12 is shown in a generally typical configuration, and includes a backhoe frame 14 which supports an articulable pivotal boom assembly 16 having a bucket 18 for performing material handling operations.

In order to lend desired stability to the tractor 10 during operation of backhoe 12, the backhoe includes a pair of vertically movable stabilizers 20 which are respectively pivotally mounted generally at opposite sides of backhoe frame 14. Each of the stabilizers 20 (sometimes referred to as outriggers) includes a generally elongated stabilizer arm 22, and a stabilizer hydraulic fluid ram 24 having an extensible piston 26 pivotally connected at 28 to the arm 22 for effecting raising and lowering of the arm, and for maintaining the arm in any selected position.

Each of the stabilizers 20 includes a stabilizer pad assembly 30 embodying the principles of the present invention. For purposes of the present disclosure, a single one of the stabilizer pad assemblies 30 will be described in detail, with the understanding that each of the stabilizers is preferably provided with a pad assembly in accordance with the illustrated configuration.

Figure 2:
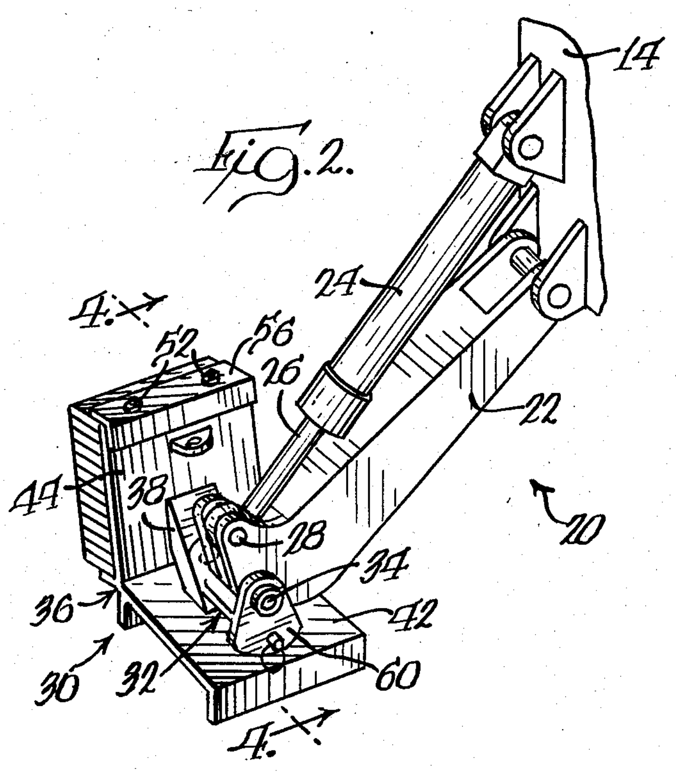
FIG. 2 is an enlarged perspective view illustrating one of the stabilizer pad assemblies shown in FIG. 1 in a first position.
Figure 3:
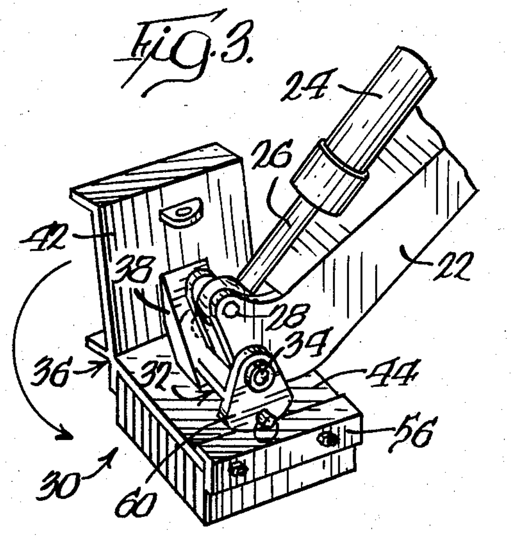
FIG. 3 is a view similar to FIG. 2 illustrating the present stabilizer pad assembly in a second position
Figure 4:
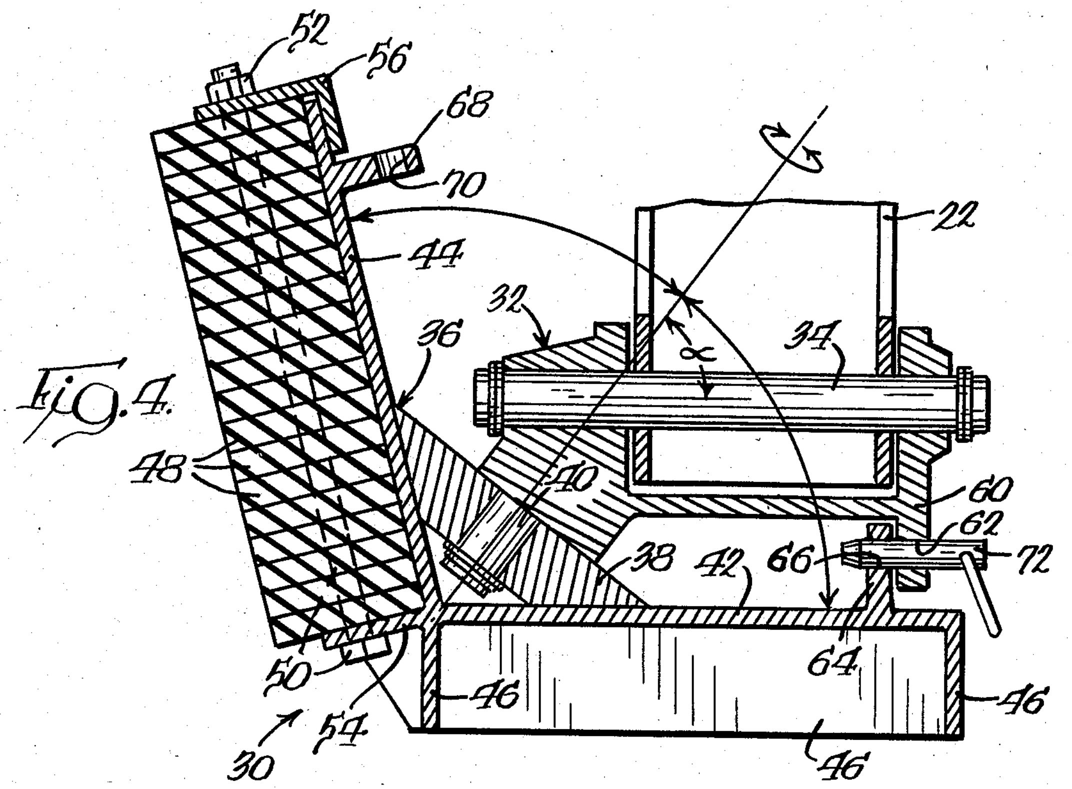
FIG. 4 is a cross-sectional view taken along lines 4—4 of FIG. 2 further illustrating the present pad assembly.

As best shown in FIGS. 2–4, stabilizer pad assembly 30 includes a one-piece mounting bracket 32 which is pivotally connected to a free end of the associated stabilizer arm 22 by a pivot pin 34. By this construction, the pad mounting bracket 32 is configured for relative pivotal movement about a first axis with respect to the stabilizer arm.

The pad assembly 30 further includes a pivotal pad member, generally designated 36, pivotally mounted on the pad bracket 32. To this end, a gusset portion 38 of the pad member 36 is pivotally connected to the bracket 32 by a pivot pin 40, thus providing pivotal movement of the pad member 36 relative to the bracket 32 about a second axis. As shown in FIG. 4, the second pivot axis is disposed at an acute angle "alpha" relative to the first pivot axis of the assembly defined by pivot pin 34. In the illustrated embodiment, the second pivot axis is shown as intersecting the first pivot axis, but it will be appreciated that the first and second axes need not be intersecting.

In accordance with the present invention, the pad member 36 includes first and second pad portions respectively designated 42 and 44. In this embodiment, the first and second pad portions are arranged at a obtuse angle with respect to each other, with each of the pad portions being positioned equi-angularly with respect to the second pivot axis defined by pivot pin 40. By this construction, the pad member 36 can readily be pivoted about the second pivot axis so that either selected one of the pad portions 42 and 44 can be positioned in a generally downwardly facing disposition for engaging the ground.

In the preferred form, one of the pad portions 42 and 44 is configured for use on relatively soft ground, while the other is arranged to provide good grip and stability on relatively hard surfaces. Accordingly, the first pad portion 42 is provided with a grouser-like configuration, and includes a first ground-engaging surface comprising a plurality of depending flanges 46 which dig into the ground for effecting a good grip.

In constrast, the second pad portion 44 is provided with a plurality of elastomeric elements 48 (FIG. 4) which thus define a resilient second ground-engaging surface. Suitable tie bolts 50 extend through the elastomeric elements 48, with suitable fastener nuts 52 provided for securing the tie bolts 50 in place so that the bolts extend through a flange 54 and an angle member 56 of the second pad portion 44 of the pivotal pad member. By this construction, the second ground-engaging surface of the second pad portion 44 is suitably resilient for use on asphalt or concrete, with periodic replacement of elastomeric elements 48 facilitated by the removable tie bolts 50.

Maintaining the selected one of the ground-engaging surfaces of the pivotal pad member 36 in position for use is effected with a lock pin arrangement. Pad mounting bracket 32 includes a flange 60 which defines a first pin-receiving opening 62. First pad portion 42 of the pad member 36 includes a flange 64 which defines a second pin-receiving opening 66, while second pad portion 44 includes a flange 68 defining another second pin-receiving opening 70. Each of the second pin-receiving openings 66 and 70 can be readily aligned with the first opening 66 by pivotal movement of pad member 36 with respect to the second axis, with a lock pin 72 being removably positionable within first opening 66 and the aligned one of second openings 66 and 70.

By this construction, either of the ground-engaging surfaces of the pad member 36 can be very easily positioned for use, with the pad member being repositionable for use of its other ground-engaging surface in just a matter of a few seconds. Notably, the one of the first and second pad portions 42 and 44 of the pad member 36 which is not being used is preferably positioned such that its respective ground-engaging surface faces generally toward the working area of the pivotal boom assembly 16 of the backhoe 12. This is a particularly desirable feature of the present construction since it desirably affords protection to the stabilizer arm 22 and the stabilizer hydraulic ram 24 against inadvertent contact by the backhoe bucket 18.

Figure 5:
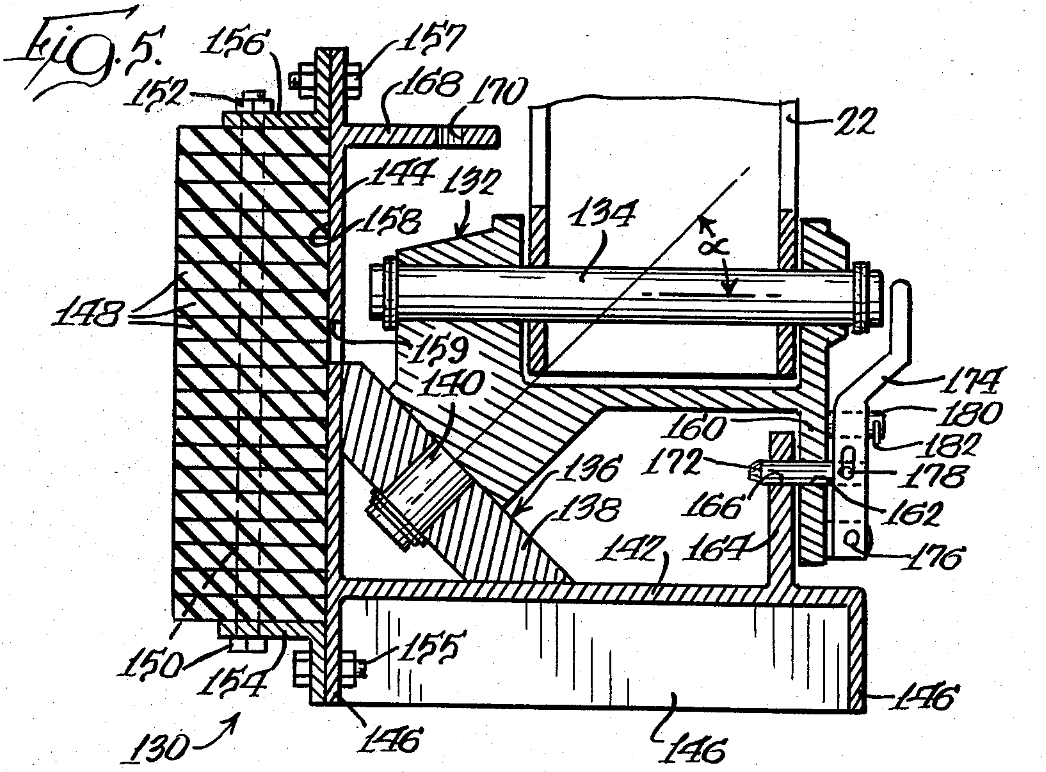
FIG. 5 is a cross-sectional view similar to FIG. 4 illustrating an alternate embodiment of the present pad assembly.

Referring now to FIG. 5, therein is illustrated an alternate embodiment of the present stabilizer pad assembly. Elements of this embodiment of the pad assembly which generally correspond to elements of the above-described embodiment are so-indicated by like reference numerals in the 100 series. As will be appreciated from the following detailed description of the alternate embodiment of the present pad assembly, designated 130, any one or more of its particular features can be readily incorporated in a pad assembly generally configured in accordance with the previous embodiment.

The stabilizer pad assembly 130 includes a pad mounting bracket 132 which is pivotally mounted on stabilizer arm 22 by a pivot pin 134 which defines a first pivot axis. A pivotal pad member 136 is in turn pivotally connected to the bracket 132 at a gusset portion 138 with a pivot pin 140. Pivot pin 140 defines a second pivot axis about which pivotal pad member 136 is pivotally movable with respect to mounting bracket 132. The second pivot axis is disposed at an acute angle "alpha" with respect to the first pivot axis defined by pivot pin 134, and the second pivot axis can, but need not, intersect the first pivot axis. Angle "alpha" is equal to one-half of the included angle between the two portions of pad member 136, and in this embodiment equals 45 degrees.

Pivotal pad member 136 includes first and second pad portions 142 and 144 which respectively define first and second ground-engaging surfaces. In this embodiment, the first and second pad portions 142 and 144 are disposed in perpendicular relationship witn respect to each other. First pad portion 142 includes a plurality of depending flanges 146, thus providing the first ground-engaging surface of the pivotal pad member with a grouser-like configuration.

The second pad portion 144 of the pivotal pad member 136 includes a plurality of elastomeric elements 148 which define a resilient second ground-engaging surface of the pad member 136. A pair of tie bolts 152 (one being shown) extend through the elastomeric elements 148, with suitable nuts 152 provided for securing the assembly together.

In this embodiment of the present pad assembly, the second pad portion 144 of the pivotal pad member 136 has been specifically configured to permit very convenient removal of the resilient elastomeric elements 148. To this end, the pad member 136 includes a removable flange member 154 through whicn tie bolts 158 extend, with the flange member 154 detachably secured to the pad member 136 by way of fasteners 155 (one being shown). Similarly, a removable angle bracket 156 is provided at the opposite side of the elastomeric elements 148, with the bracket 156 detachably secured to the pivotal pad member 136 by fasteners 157 (one being shown). By this construction, the assembly of the elastomeric elements 148 can be very conveniently removed as a unit from the pivotal pad member 136 merely by removing the fasteners 155 and 157. In effect, the second pad portion 144 of member 136 is thus configured to provide a third substantially flat ground-engaging surface 158. The surface 158 is particularly suited for use on grassy ground surfaces since damage to the grass is minimized, and to this end, the second pad portion defines a stake hole 159 which permits insertion of a stake through the pad portion and into the ground in order to provide the associated backhoe with the desired support and stability.

As in the previous embodiment, this embodiment of the present stabilizer pad assembly includes a lock pin arrangement for maintaining the selected one of first and second pad portions 142 and 144 in a downwardly facing diposition for use. Indistinction from the previous embodiment, this embodiment includes a lock pin which is movably mounted on the pad mounting bracket 132.

The mounting bracket 132 includes a flange 160 which defines a first pin-receiving opening 162. First pad portion 142 of pad member 136 includes a flange 164 which defines one of a pair of second pin-receiving openings, designated 166. The second pad portion 144 of pad member 136 includes a flange 168 which defines another second pin-receiving opening, designated 170. Attendant to pivotal movement of pad member 136 about the second pivot axis defined by pin 140, either of the second pin-receiving openings 166 and 170 can readily be aligned with the first pin-receiving opening 162.

A lock pin 172 is provided which is adapted to be received within the first pin-receiving opening 162 and the aligned one of the second pin-receiving openings 166 and 170. A noted, lock pin 172 is movably mounted on mounting bracket 132, and to this end, a lock latch 174 is provided. The lock latch 174 is pivotally mounted on the bracket 132 at a pivot 176, with lock pin 172 in turn pivotally connected to the latch 174 at pivot 178.

A latch lock pin 180 fixed to mounting bracket 132 is received through the lock latch 174, with a suitable removable spring clip 182 provided for preventing unintended movement of the latch 174. When it is desired to reposition pivotal pad member 136, spring clip 182 can easily be removed, and the latch 174 pivoted about pivot 176 so that lock pin 172 is withdrawn from the aligned one of the second pin-receiving openings 166 and 170. As in the previous embodiment, repositioning of pivotal pad member 136 is very easily effected, thus desirably promoting efficient operation and use of the backhoe 12.

From the foregoing, it will be observed that numerous modifications and variations can be effected without departing from the true spirit and scope of the novel concept of the present invention. It will be understood that no limitation with respect to the specific embodiments is intended or should be inferred. It is, of course, intended to cover by the appended claims all such modifications as fall within the scope of the claims.

What is claimed is:

1. A selectively positionable ground-engaging pad assembly for a vertically movable stabilizer arm of a material handling implement, comprising:

pad bracket means pivotally connected to a free end of said stabilizer arm for relative pivotal movement about a first axis;

a pad member having first and second portions respectively defining first and second ground-engaging surfaces;

means pivotally connecting said pad member to said bracket means for pivotal movement of said pad member with respect to said bracket means about a second axis which extends at an acute angle with respect to said first axis; and means for selectively locking a selected one of said first and second ground-engaging surfaces in a generally downwardly facing disposition for supporting said stabilizer arm.

2. A selectively positionable pad assembly in accordance with claim 1, wherein said second axis intersects said first axis.

3. A selectively positionable pad assembly in accordance with claim 1, wherein said first ground-engaging surface comprises depending flange means for enhancing engagement of said pad assembly with relatively soft ground, and said second ground-engaging surface comprises resilient means for resiliently engaging relatively hard ground.

4. A selectively positionable pad assembly in accordance with claim 1, wherein said locking means comprises a first pin-receiving opening defined by said bracket means, and a pair of second pin-receiving openings respectively defined by said first and second pad portions, each of said second openings being selectively positionable in alignment with said first opening whereby lock pin means are received through said first opening and the aligned one of said second openings to maintain said selected one of said first and second ground-engaging surfaces in said generally downwardly facing disposition.

5. A selectively positionable pad assembly in accordance with claim 4, wherein said lock pin means is movably mounted on said bracket means.

6. A selectively positionable pad assembly in accordance with claim 5, wherein said lock pin means is mounted on said bracket means by latch means to which said lock pin means is pivotally connected, said latch means being pivotally mounted on said bracket means.

7. A selectively positionable pad assembly in accordance with claim 3, wherein said resilient means of said second ground-engaging surface are removably mounted on said second portion of said pad member, said second portion thereby defining a third substantially-flat ground-engaging surface.

8. A selectively positionable ground-engaging pad assembly for a vertically movable stabilizer arm of a backhoe having a pivotal boom assembly, comprising:

pad bracket means pivotally connected to a free end of said stabilizer arm for pivotal movement about a first axis;

a pad member having first and second portions respectively defining first and second ground-engaging surfaces, said first surface including depending flange portions for engagement with relatively soft ground, and said second surface including resilient means for engagement with relatively hard ground;

means pivotally connecting said pad member to said bracket means for pivotal movement of said pad member with respect to said bracket means about a second axis which extends at an acute angle with respect to said first axis; and means for selectively locking a selected one of said first and second ground-engaging surfaces in a generally downwardly facing disposition for supporting said stabilizer arm, the other one of said ground-engaging surfaces being positioned to generally face the working area of said pivotal boom assembly of said backhoe.

9. A selectively positionable pad assembly in accordance with claim 8, wherein said second axis intersects said first axis.

10. A selectively positionable pad assembly in accordance with claim 8, wherein said locking means comprises a first pin-receiving opening defined by said bracket means, and a pair of second pin-receiving openings respectively defined by said first and second pad portions, each of said second openings being selectively positionable in alignment with said first opening whereby lock pin means are received through said first opening and the aligned one of said second openings to maintain said selected one of said first and second ground-engaging surfaces in said generally downwardly facing disposition.

11. A selectively positionable pad assembly in accordance with claim 10, wherein said locking means further includes latch means pivotally mounted on said bracket means, said lock pin means being pivotally connected to said latch means whereby said lock pin means is selectively positionable in said pin-receiving openings by movement of said latch means.

12. A selectively positionable pad assembly in accordance with claim 10, wherein said first and second pad portions are generally perpendicular with respect to each other.

13. A selectively positionable pad assembly in accordance with claim 10, wherein said first and second pad portions are arranged at an obtuse angle with respect to each other.

14. A selectively positionable pad assembly in accordance with claim 10, wherein said resilient means which define said second ground-engaging surface are removable from said pad member, said second portion of said pad member thus defining a third suostantially flat ground-engaging surface, and means for receiving associated ground-engaging stake means therethrough when said resilient means are removed.

* * * * *